Nov. 13, 1951
R. N. JANEWAY ET AL
2,574,788
END CONNECTION FOR ENERGY ABSORBERS
Filed March 22, 1948
3 Sheets-Sheet 1
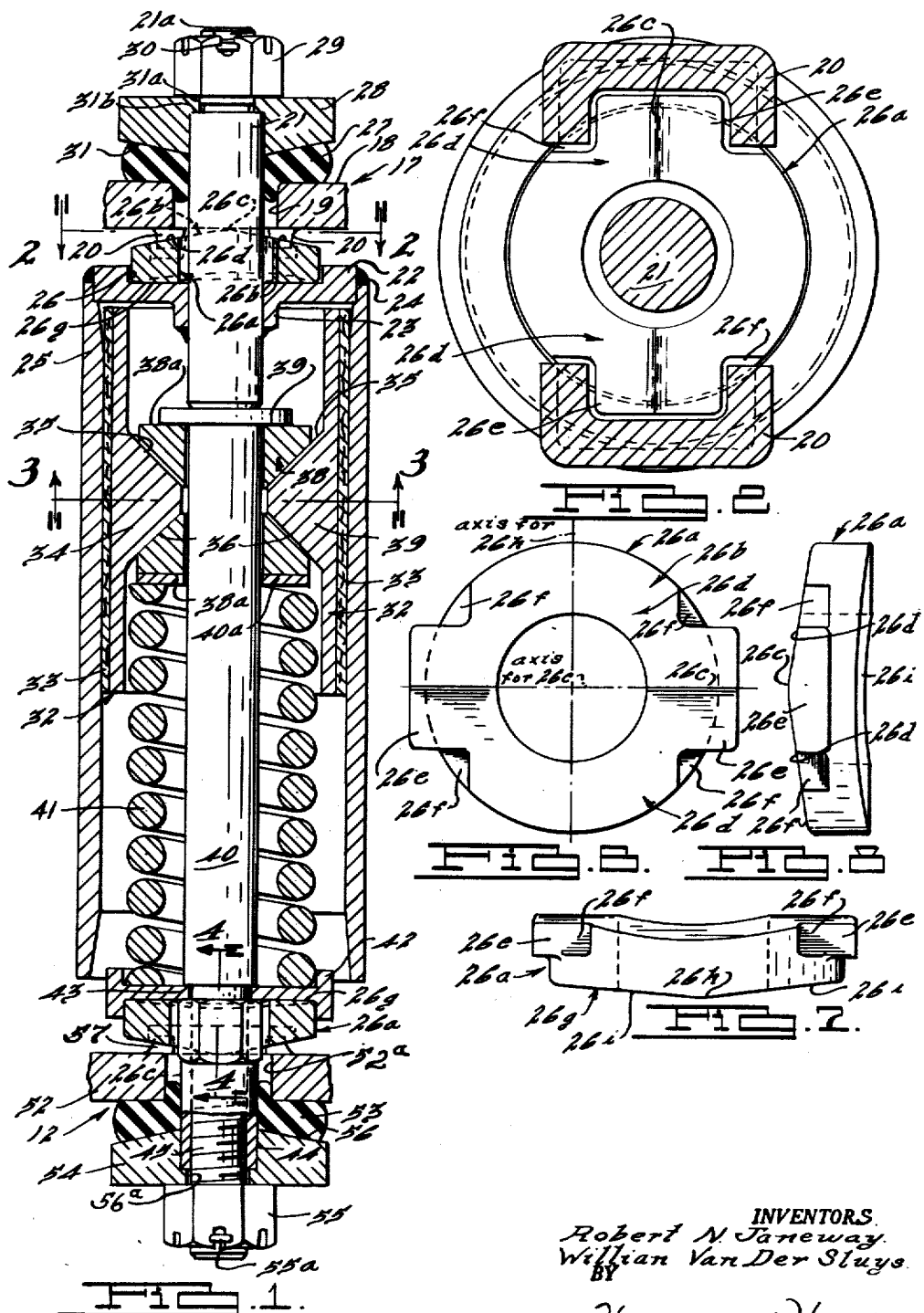
INVENTORS.
Robert N Janeway.
William Van Der Sluys.
BY
Harness and Harris
ATTORNEYS.

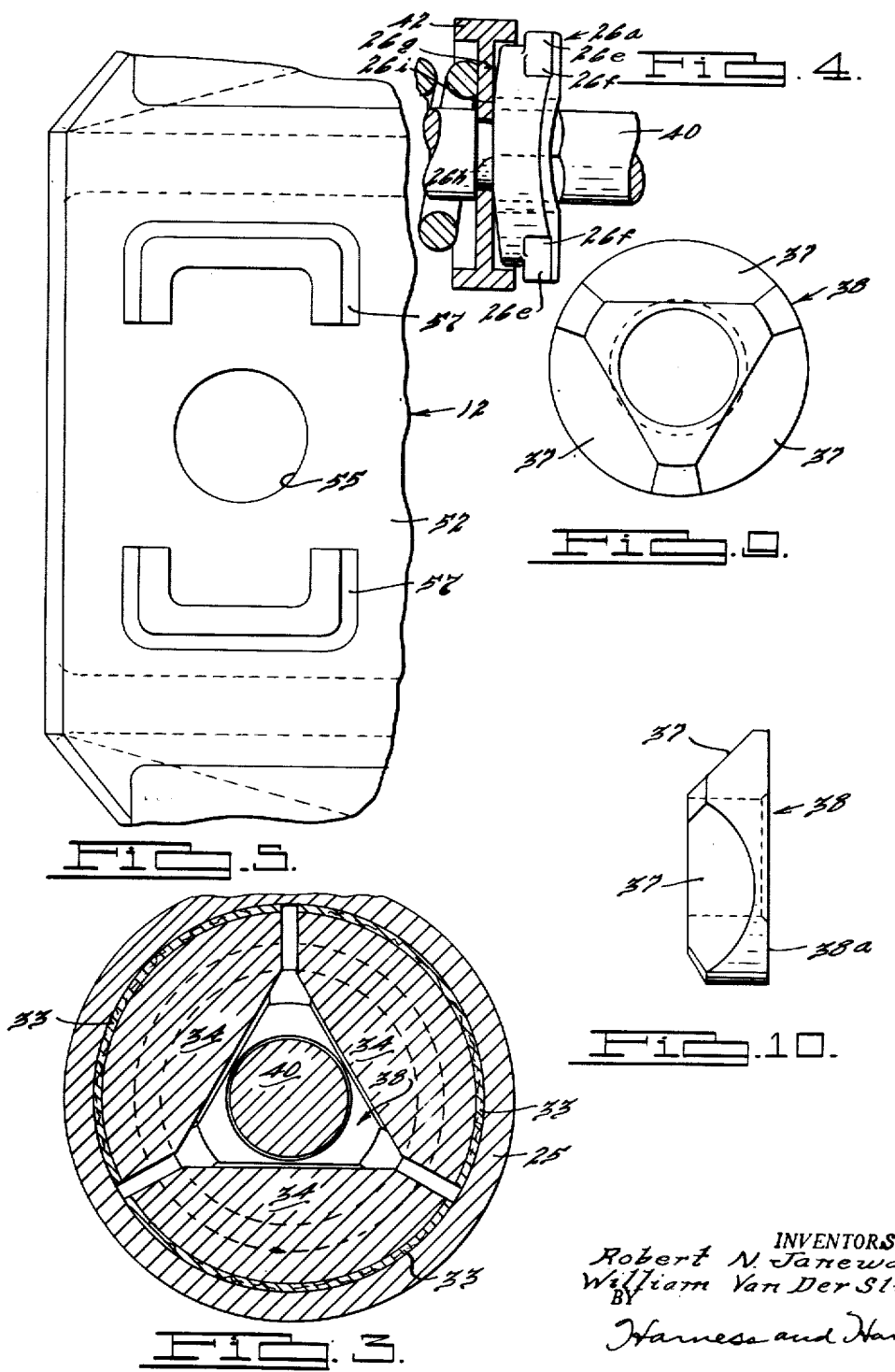

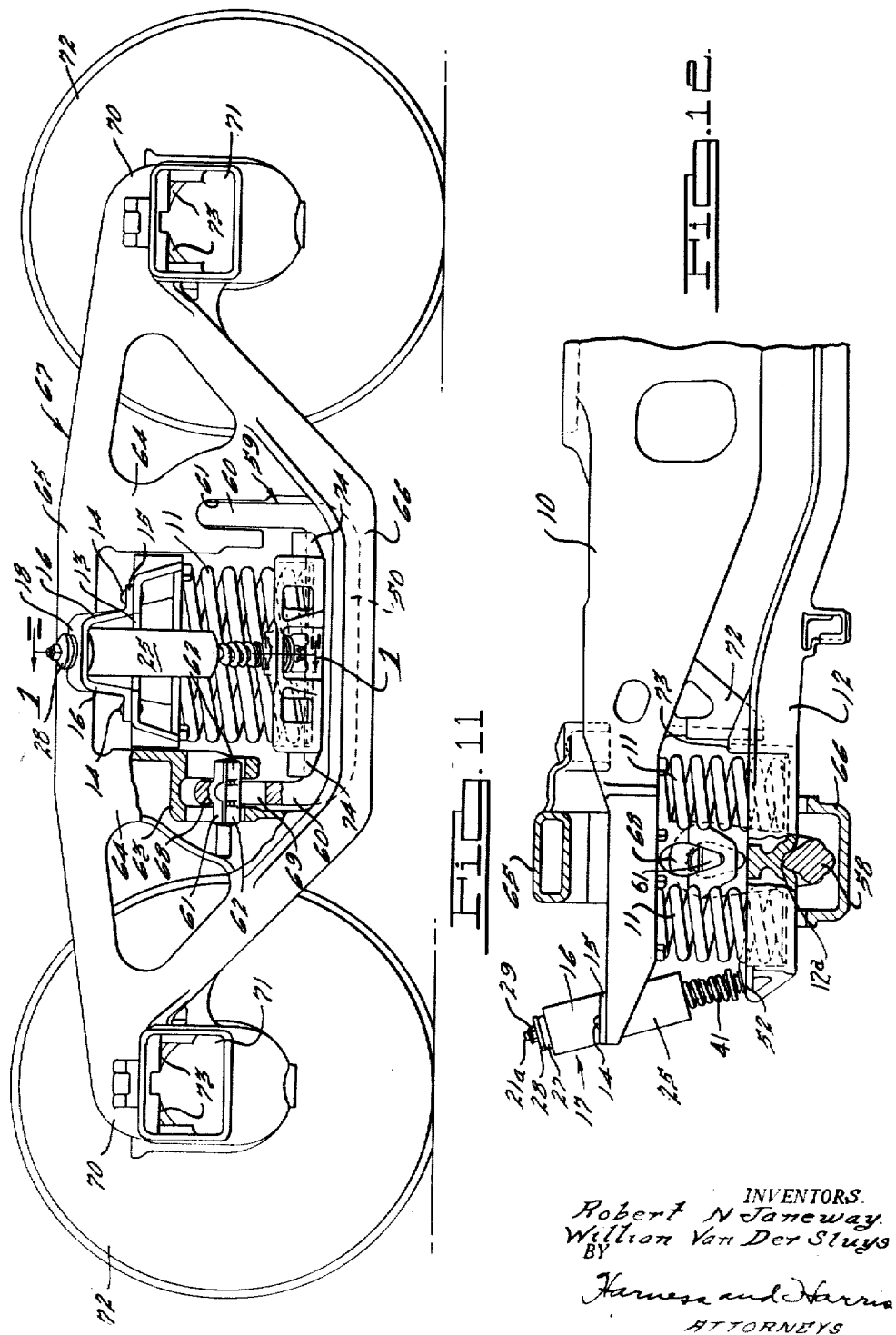

Patented Nov. 13, 1951

2,574,788

UNITED STATES PATENT OFFICE 2,574,788

END CONNECTION FOR ENERGY ABSORBERS

Robert N. Janeway and William Van Der Sluys, Detroit, Mich., assignors to Chrysler Corporation, Highland Park, Mich., a corporation of Delaware Application March 22, 1948, Serial No. 16,234

30 Claims. (Cl. 267—9)

1

This application relates to a damping means or energy absorber. More specifically it relates to an arrangement by which the damping means is connected to members between which relative movement is to be damped.

It is desired to connect an energy absorber between a plank of a railway truck and a bolster spring-supported on the plank. It is preferable that the absorber be capable of damping all relative movement of the plank and the bolster in the direction in which the spring support acts and perhaps also in other directions.

We have designed the end connections of damping means so as to cause it to be capable of these actions. The damping means and its end connections are adapted for use between other parts than the bolster and plank of a railway truck.

An object of the present invention is to provide improved connections for a damping means to spring-connected parts between which relative movement is to be damped. These parts may be the bolster and plank of a railway truck.

A further object of the invention is an improved end connection for a shock absorber that is inflexible in the sense of permitting no relative movement of the portions of the connection that would permit transmission of vibrations without involvement of the shock absorber.

Another object is to provide improvements in the connections of an energy absorber to parts between which damping is to take place such that the connections are so related to the absorber that relative vibration between the parts could not take place without displacement of the energy-absorbing elements of the absorber.

Still another object is to design an end connection for a damping means so that it is sufficiently inflexible as to prevent transmission of vibrations without involvement of the damping means and yet it may move angularly with respect to the parts it connects.

Other objects will be apparent from the disclosure.

In the drawings:

Fig. 1 is a sectional view taken on the line 1—1 of Fig. 11 showing a shock absorber and its end connections according to the present invention;

Fig. 2 is a sectional view taken on the line 2—2 of Fig. 1;

Fig. 3 is a sectional view taken on the line 3—3 of Fig. 1;

Fig. 4 is a sectional view taken on the line 4—4 of Fig. 1;

Fig. 5 is a plan view of a portion of a plank to which the shock absorber is connected;

2

Figs. 6, 7, and 8 are plan, front, and side views, respectively, of a part used in an end connection for the shock absorber;

Figs. 9 and 10 are plan and end views of a wedge ring used in the shock absorber;

Fig. 11 is a side view of a railroad truck, with parts broken away, on which the shock absorber and its end connections of the present invention are applied; and Fig. 12 is a transverse view partially in section of a railroad truck of Fig. 11.

The reference character 10 designates a bolster supported at each end by a group of coil springs 11 on a plank 12, as seen in Figs. 11 and 12. The end of the bolster 10 is recessed as designated at 13, and to the recessed end are fastened by rivets 14, flanges 15 formed on legs 16 of a U-shaped bracket 17 having a base portion 18 above the end of the bolster 10.

The base 18 of the bracket 17 is shown at the top of Fig. 1. The bracket base 18 is provided with an opening 19 and a pair of U-shaped projections 20 on opposite sides of the opening 19 and spaced therefrom. Through the opening 19 extends a rod or stem 21 having a reduced threaded end 21$^a$. The rod 21 extends through an opening in a member 22. This member 22 is bonded to the end of a cylinder or barrel 25, as indicated at 24, to close one end thereof.

The end member 22 has a recess 26, receiving an annular rocker block or plate 26$^a$, which fits loosely on the stem 21. The rocker 26$^a$ has an upper rocking surface 26$^b$ in engagement with the lower side of the bracket base 18 at the opening 19. The upper rocker surface 26$^b$ has a journal portion 26$^c$ as viewed in Fig. 1, which is curved outwardly about an axis perpendicular to the plane of the drawing. The other portions 26$^d$ of the upper rocker surface 26$^b$ are formed as planes slightly angled to one another and to the lower side of the bracket base 18. Figs. 7 and 6 show the general outer shape of the rocker to be ring-like or circular in plan elevation except at the upper side 26$^b$ where there are rectangular extensions 26$^e$ of U-shaped outline extending beyond the outer circular outline and also within it so that recesses 26$^f$ are formed in the upper surface 26$^b$. Fig. 2 shows that the extensions 26$^e$ are received by the U-shaped projections 20 on the bracket base 18, so that any appreciable angular or rotary movement of the rocker 26$^a$ about the axis of the rod 21 is prevented. The rocker 26$^a$ has a lower rocking surface 26$^g$ in engagement with the bottom of the recess 26 in the member 22. The lower rocker surface 26$^g$, as indicated in Fig. 7, has a journal portion 26$^h$ curved outwardly about an axis perpendicular to the plane of the drawing in Fig. 7 and in the plane of the drawing in Fig. 1. The lower rocker surface 26ᵍ has other portions 26ⁱ, which are formed in planes slightly angled to one another and to the bottom of recess 26 in end member 22. The axis for journal portion 26ʰ of lower surface 26ᵍ is perpendicular to the axis for said journal portion 26ᶜ for upper surface 26ᵇ, as may be seen in Fig. 6, in which both axes are designated. The opposed surface portions 26ᶜ and 26ʰ of the rocker block 26ᵃ constitute the rocking surfaces about which the cylinder 25 and its associated elements pivot. On the outer side of the bracket base 18 is a resilient ring 27, formed of a suitable material such as rubber, surrounding the stem 21. The resilient ring 27 is compressed against the bracket base 18 by a rigid washer 28 held in place by a nut 29 engaging the threaded end 21ᵃ of stem 21. A cotter pin 30 holds the nut against undesired angular movement on the stem 21. The washer 28 has a conical surface 31 in engagement with resilient ring 27, whereby the compression of the ring is maintained relatively high at the inner periphery of the resilient ring and low at its outer periphery and thus too high a stress in the outer periphery is avoided, which stress would otherwise be set up when the rod 21 is tilted out of a perpendicular position with respect to the bracket base 18. Compression of the resilient ring 27 during assembly is limited or predetermined by engagement of a reduced portion 31ᵃ on the inner periphery of the washer 28 with a shoulder 31ᵇ formed between the reduced threaded end 21ᵃ and the balance of the rod 21.

Positioned within the cylinder 25 are three segmental shoes 32 formed preferably of metal, each being provided with cylindrical outer surfaces having suitable friction facings 33 in engagement with the interior surface of the cylinder 25. These facings may be non-metallic. Each shoe 32 has a wedge portion 34 having opposed flat inclined wedging surfaces 35 and 36. The surfaces 35 are engaged by three flat surfaces 37 formed on a wedge ring 38, which is illustrated in detail in Figs. 9 and 10. Flat surfaces 37 of another ring 38 also engage the surfaces 36. Each ring 38 has a flat end 38ᵃ. The flat end of one ring is engaged by a flanged end 39 formed on a rod 40 extending in the cylinder 25 freely through the segmental shoes 32. The flat end of the other ring 38 is engaged by a washer 40ᵃ, which is in turn engaged by one end of a coil spring 41 mounted on the rod 40. The other end of the coil spring 41 is engaged by a retaining ring 42 held against a shoulder 43 on rod 40 by sleeve 44 having an internal thread at one end in engagement with a threaded portion 45 at the lower end of the rod 40.

A lower rocker ring 26ᵃ, like the upper rocker ring 26ᵃ engaging the bracket base 18, is received in a recess in the retaining ring 42. This lower rocker 26ᵃ fits loosely over the sleeve 44 yet is firmly held in the recess in the ring 42. The lower rocker 26ᵃ has a rocking surface 26ᵍ with an outwardly curved journal portion 26ʰ (Fig. 4) in rocking engagement with the outer face of retaining ring 42. The curved journal portion 26ʰ has an axis of curvature in the plane of the drawing in Fig. 1 and perpendicular to the drawing plane in Fig. 4. The lower rocker 26ᵃ has a rocking surface 26ᵇ with an outwardly curved journal portion 26ᶜ in rocking engagement with the upper side of a sloping end portion 52 formed on the end of the plank 12. The axis of the curved journal portion 26ᶜ is perpendicular to the plane of the drawing in Fig. 1. U-shaped projections 57 on the plank end portion 52 receive rectangular extensions 26ᵉ on the lower rocker 26ᵃ in the manner illustrated for the upper rocker and the U-shaped projections 20 on the bracket base 18 so that any appreciable angular or rotary movement of the lower rocker about the rod 40 as an axis is prevented. The rectangular extensions 26ᵉ and recesses 26ᶠ on lower rocker 26ᵃ are seen in Fig. 4.

The sleeve 44 and the reduced end of the rod 40 extend through an opening 52ᵃ in the plank portion 52, the sleeve being spaced from the sides of the opening. A resilient ring 53, which may be formed of rubber or other suitable material is positioned on the sleeve 44 in engagement with the lower side of the plank portion 52. The resilient ring 53 is held compressed against the plank portion 52 by a rigid washer 54 retained on the end of rod 40 by a nut 55 engaging the threaded portion 45 of the rod 40 beyond the sleeve 44. A cotter pin 55ᵃ holds the nut 55 against rotational movement. The rigid washer 54 has a conical surface 56 in engagement with the resilient ring 53 so that the compression thereof is relatively high at the inner periphery and relatively low at the outer periphery, whereby the ring 53 will not be too highly stressed at its outer periphery when the rod 40 is tilted angularly from its perpendicular position with respect to the plank portion 52. The washer 54 has an internal shoulder 56ᵃ at its inner periphery in engagement with the end of the sleeve 44, and thus the position of the washer 54 is fixed so that the precompression of the resilient ring 53 during assembly is fixed or predetermined. As previously mentioned the U-shaped projections 57 on plank portion 52 engage the rectangular extensions 26ᵉ on the lower rocker 26ᵃ to prevent the latter from having angular or rotary movement about the rod 40 as an axis.

The barrel 25 and the shoes 32 and associated parts constitute an energy absorber acting between the bolster 10 and the plank 12. In Fig. 1 the energy absorber is as collapsed or shortened in length as it can be, for the shoes 32 extend to the upper end of the barrel 25, and the enlarged end 39 on the rod 40 abuts the rod 21. This condition would normally occur only during assembly of the absorber unit. Figs. 11 and 12 show a relative position of bolster 10 and plank 12 indicating light loading, and the degree to which the coil spring 41 extends beyond the lower end of the barrel 25 indicates that the energy absorber is relatively extended in length.

As previously stated, upper and lower rockers 26ᵃ each have curved rocking journal portions 26ᶜ and 26ʰ having axes transverse to one another. Because of the transverse relation of the axes of the rocking journal portions 26ᶜ and 26ʰ the rockers in effect provide universal rocking freedom in the connections of the energy absorber to the bolster bracket 18 and the plank portion 52. This condition is not dependent on the fact that the axes of the rocking journal portions of the upper rocker are respectively parallel to those of the lower rocker. While these upper and lower pivotal blocks 26ᵃ are shown to be non-rotatably mounted by the U-shaped projections 20 and 57, respectively, on bolster bracket 17 and plank portion 52 engaging the rectangular extensions 26ᵉ on the rockers, still the universal rocking or pivoting freedom of the energy absorber would be present even if the rockers 26ᵃ were permitted to rotate about the energy absorber as an axis.

The rockers 26ᵃ in this particular construction are prevented from rotating, because during operation of the railway truck the relative horizontal movement between bolster 10 and plank 12 longitudinally of bolster and plank (transversely of the truck) is appreciable and definitely greater than relative horizontal movement between bolster and plank transversely of bolster and plank (longitudinally of the truck). Thus, in Fig. 1, the aforesaid greater relative movement means shifting of the bolster bracket 18 to left or right in the plane of the drawing with respect to the plank portion 52. Such relative shifting in the plane of the drawing involves pivoting about the axes of the surface portions 26ᶜ of the upper and lower rockers 26ᵃ, since these axes are transverse to the plane of the drawing. Since these axes are also individually nearer the resilient rings 27 and 53 than are the axes of rocking surface portions 26ʰ, the pinching of the resilient rings 27 and 53 for a given amount of relative movement of bolster and plank in the plane of the drawing is less than it would be if the pivoting took place about the axes of surface portions 26ʰ. The U-shaped projections 20 and 57 on bolster bracket 18 and plank portion 52, respectively, and the rocker extensions 26ᵉ prevent rotation of the rockers 26ᵃ thereby maintaining the axes of surface portions 26ᶜ of the rockers transverse to the plane of the drawing, as shown in Fig. 1, so as to provide for increased pivotal movement of the rockers 26ᵃ about an axis extending longitudinally of the truck over that about an axis extending transversely of the railway truck. It is obvious that the several axes of the rocker blocks may be arranged in any specific manner to accomplish any desired pivotal movement.

The coil spring 41 on the rod 40 acts through the inclined surfaces 35, 36, and 37 on the wedge portions 35 of the shoes 32 and the rings 39 to urge the shoes 32 outwardly against the interior of the barrel or cylinder 25. Because of frictional engagement of the facings 33 on the shoes 32 with the interior of the cylinder, movement of the cylinder 25 in a longitudinal direction with respect to the shoes 32 is resisted by a force proportional to the force with which the spring 41 urges the shoes 32 outwardly against the cylinder 25. The coefficient of friction of the shoe facings 33 is such that the frictional resistance to movement of the barrel 25 relative to the facings 33 is always less than the resistance to movement of the spring supported wedges 38. The resistance to downward movement of the wedges 38 results from the upward thrust of the compressed spring 41 on the wedges 34. Thus wedges 38, 34 and the spring 41 do not move vertically during vertical movement between the spaced members 17 and 12 for the barrel 25 moves relative to the shoes 32. As a result of this arrangement there is a substantially constant frictional damping or snubbing force acting between shoes 32 and barrel 25 regardless of the relative displacement of the members 17 and 12. Each of the resilient rings 27 and 53 is precompressed by the washers 28 and 54 and the nuts 29 and 55 by a force greater than that required to effect longitudinal movement of the shoes 32 with respect to the cylinder 25. Thus for forces applied tending to move the bolster 10 and its bracket 17 away from the plank 12 there will be no deformation of the resilient rings 27 and 53, because the force required for movement of the cylinder 25 with respect to the segmental shoes 32 is less than the force of precompression of the rings 27 and 53, and thus there will be relative movement between the shoes 32 and the cylinder 25 before further compression of rings 27 and 53 can take place. If forces are applied to move the bracket 17 and the bolster 10 toward the plank 12, there can be no relative movement of the end connections of the shock absorber with respect to the bolster bracket 17 and the plank 12, because the rockers 26ᵃ rest solidly against the bolster bracket 17 and plank portion 52, respectively. Relative movement between the bolster bracket 17 and the plank portion 52 in directions transverse of the rod 40, i. e., lengthwise of bolster and plank and transversely thereof, may take place by virtue of the curved journal portions 26ᶜ and 26ʰ, transverse to one another, on the rockers 26ᵃ.

It is to be noted that, if the ends of the absorber were respectively connected by conventional means to the plank and bolster, i. e., resilient means such as springs or rubber to resist movement in both directions, vibrations would be transmitted by such resilient means without displacement of the energy-absorbing elements of the absorber.

The energy absorbers in this construction operate to damp all relative movement between plank and bolster primarily in the vertical direction in which the coil springs 11 provide resilient support of the bolster on the plank, because the absorbers extend generally in the vertical direction of the springs. However, the absorbers will also be effective to damp relative movement between bolster and plank both transversely of the truck and longitudinally thereof involving a change in the spacing between the end connections of each absorber to plank and bolster. It is to be noted that since each energy absorber is somewhat inclined to the vertical, it is more effective to damp relative movement between plank and bolster transversely than it would be if it extended truly vertically.

The plank 12 has a transverse groove 12ᵃ on its lower side, as shown in Fig. 12, receiving a base 58 of a swing hanger 59 having legs 60. The swing hangers are pivotally mounted on pivot pins 61 having wedge-shaped end portions 62 fitting in correspondingly shaped bases of openings formed in portions 63 forming parts of columns 64 connecting upper compression part 65 and lower tension part 66 of a side frame 67. The lower tension part 66 is U-shaped (see Fig. 12) and partially houses the swing-hanger base 58. The central portion of each pivot pin has an upper curved surface 68 upon which rests a correspondingly curved surface in an opening 69 in the end of each swing hanger leg 60. The side frame 67 has a bearing portion 70 on each end receiving a journal box 71 mounting one end of an axle, not shown, upon which is mounted a wheel 72. As previously stated, a groove in the bottom of the plank 12 engages the swing hanger base 58. The plank 12 has lateral extensions 74 at the groove 12ᵃ in the bottom thereof engaging the swing hanger base 58, which extensions are also grooved to engage the swing hanger base. The bearing portions 70 of the side member 67 engage the journal boxes 71 at their tops at a level indicated by 73, which is seen to be above the pivot axis of the swing hanger 59 on the pivot pins 61. Thus the forces transmitted to the side member 67 by the swing hanger 59 will not tend to tilt the side member in such a way as to make it unstable.

Unsquaring of the side members 67 is controlled or resisted by the plank 12, the swing hangers 59, and the mounting pins 61.

Fig. 11 shows only one end of the bolster 10 and the plank 12 and one swing hanger and one side frame 67, but it will be understood that there is another side frame carrying a swing hanger that supports the other end of the plank, which in turn supports the other end of the bolster through a set of springs similar to the four coil springs 11 shown in Fig. 11. Likewise a second shock absorber or snubber 25 connects the unshown ends of the bolster and plank in the manner illustrated in Fig. 11.

In actual operation of the railroad truck illustrated, the bolster 10 may move up or down, i. e., toward and away from the plank 12. Since the shock absorber is somewhat inclined, relative vertical movement between the bolster 10 and the plank 12 involves some change in angle of the shock absorber with respect to the planks 10 and 12, and this is permitted by the rolling connections of the shock absorber ends with the bolster 10 and plank 12 through the rockers 26ª at the upper and lower ends of the shock absorber. The swing hangers 59 may pivot about the pin 61 as axes, causing the swing hanger bases 58 and the plank 12 to move transversely of the truck. Thus there may be some movement of the plank with respect to the bolster transversely of the truck or, viewed in another way, longitudinally of the plank and the bolster. This relative movement is permitted by the rockers 26ª at the ends of the shock absorber.

Coil springs 11 offer some resistance to this relative longitudinal movement between plank and bolster, but such movement may take place to the extent permitted by projection 72 depending from bolster 10 and an upstanding flanged projection 73 on plank 12. As shown in Fig. 12, projection 72 extends into projection 73 and there is a slight space between portions of the projections that will contact after a small amount of movement of the plank 12 to the right with respect to the bolster 10. After such contact, further movement to the right of the plank 12 will produce movement to the right of the bolster 10. Likewise the projections 72 and 73 permit a small amount of movement of the bolster 10 to the left with respect to the plank 12 and thereafter conjoint movement to the left of the bolster and the plank. It is to be understood that there are corresponding projections 72 and 73 on the right end of bolster and plank which portions are not shown. These projections will permit movement to the left of the plank 12 with respect to the bolster 10 in a similar amount and thereafter conjoint movement to the left of bolster and plank. Likewise they will permit movement to the right of the bolster 10 with respect to the plank 12 and thereafter conjoint movement to the right.

We claim:

1. In combination, a pair of members, spring means acting between the members to provide support of one member on the other member, an energy absorber comprising a cylinder, a plurality of segmental shoes movably mounted within and engaging the inside of the cylinder and having two sets of inclined surfaces, a rod in the cylinder having a first shoulder generally near one end thereof, a second shoulder on the rod generally near the other end thereof and facing in the same direction as the first shoulder, a first ring positioned on the rod in engagement with the first shoulder and with one set of inclined surfaces on the segmental shoes, a second ring positioned on the rod in engagement with the other set of inclined surfaces on the segmental shoes, a coil spring positioned on the rod with one end in engagement with the second ring, and a retaining ring positioned on the rod in engagement with the other end of the coil spring and with the second shoulder, a sleeve connected to the said other end of the rod so as to hold the retaining ring against the second shoulder, means connecting the said other end of the rod to one of the spring supported members, said means comprising an opening in the said one member receiving the said other end of the rod and the sleeve, a first rigid rocker block positioned on the sleeve and having at one side a first curved journal portion in engagement with the retaining ring and at the opposite side a second curved journal portion in engagement with the inner side of said one member at the opening therein these curved journal portions having axes transverse to one another, a resilient annulus positioned on the said other end of the rod in engagement with the outer side of the said one member, and means cooperating with the said other end of the rod to compress the resilient annulus with a force greater than that required to shift the segmental shoes along the cylinder, the last mentioned means being in engagement with an end of the sleeve to predetermine the compression of the resilient annulus, and means connecting the cylinder to the other spring supported member, said last-mentioned connecting means comprising an opening in the said other member, a base member secured to the end of the cylinder associated with said other member and having a stem projecting therefrom through the opening in the said other member, a second rigid rocker block positioned on the stem and having at one side a first curved journal portion in engagement with the base and at the opposite side a second curved journal portion in engagement with the inner side of the other member at the opening therein the axes of these curved journal portions being transverse to one another, a resilient annulus on the stem at the outer side of the member, and means cooperating with the stem to compress the last-mentioned annulus against the outer side of the said other member with a force greater than that required to shift the segmental shoes along the cylinder.

2. In combination, supporting and supported members, spring means associated with the members acting between the members, damping means comprising a barrel, segmental shoes movably mounted within and engaging the interior of the barrel, a rod extending into the barrel through the segmental shoes and having a shoulder toward and facing one end thereof, and means for yieldingly urging the segmental shoes outwardly against the barrel, including a coil spring positioned on the rod with one end associated with the segmental shoes, a retaining ring positioned on the rod in engagement with the other end of the coil spring and with the rod shoulder, a sleeve connected to the said one end of the rod so as to hold the retaining ring against the shoulder, means connecting the said one end of the rod to one member, said means comprising an opening in the said one member receiving the said one end of the rod and sleeve, a rigid rocker ring positioned on the sleeve and having at one side a first cylindrical surfaced journal portion in engagement with the retaining ring and at the opposite side a second cylindrical surfaced journal portion in engagement with the inner side of the said one member at the opening therein, the axis of the first cylindrical journal portion being transverse to that of the second cylindrical journal portion, a resilient annulus positioned on the rod at the outer side of the said one member, and means engaging the said one end of the rod to precompress the resilient annulus against the said other side of the said one member with a force greater than that required to shift the segmental shoes with respect to the barrel, said last mentioned means engaging the sleeve to predetermine the compression of the resilient annulus, and means for connecting the barrel to the other member.

3. In combination, supporting and supported members, spring means acting between the members, damping means for said spring supported members comprising a barrel, segmental shoes movably mounted within the barrel and engaging the interior of the barrel, a rod having an end extending into the barrel through the segmental shoes, and means for yieldingly urging the segmental shoes outwardly against the barrel, means for connecting the rod to one member, comprising an opening in the said one member receiving the other end of the rod, a rigid rocker block positioned on the said other end of the rod and having at one side a first curved journal portion rockingly related to the barrel and at the opposite side a second curved journal portion in rocking engagement with one side of the said one member, the axes of the curved journal portions being transverse to one another, a resilient ring positioned on the rod at the other side of the said one member, means engaging the rod to precompress the resilient ring against the said other side of the said one member with a force greater than that required to shift the segmental shoes with respect to the barrel, and means for connecting the barrel to the other member.

4. In combination, supporting and supported members having inner sides facing one another, spring means acting between the members, damping means associated with said members comprising a barrel, segmental shoes movably mounted within and engaging the interior of the barrel, a rod having a portion extending into one end of the barrel through the segmental shoes, and means for yieldingly urging the segmental shoes outwardly against the barrel, including a coil spring positioned on the rod and associated with the segmental shoes, a retainer for the spring mounted on the rod, means for connecting another portion of the rod to one member, comprising an opening in the said one member receiving the last-mentioned portion of the rod, a first rigid rocker ring positioned on the rod and having at one side a curved journal surface in engagement with the retainer and at the opposite side a curved journal surface in engagement with the inner side of the said one member, the axes of the curved journal surfaces being transverse to one another, the said opposite side of the first rocker having opposed radially extending portions of U-shaped outline, U-shaped projections on the said one side of the said one member engageable with and receiving the U-shaped portions of the rocker to restrict rotary movement of the rocker relative to the members, a first resilient ring positioned on the rod at the outer side of the said one member, means precompressing the first resilient ring against the said other side of the said one member with a force greater than that required to shift the segmental shoes with respect to the barrel, and means for connecting the barrel to the other member, comprising an opening in the said other member, an end piece for the other end of the barrel having a base bonded to the end of the barrel, a stem projecting from the base into the opening in the said other member, a second rigid rocker ring positioned on the stem and having at one side a curved journal surface engaging the base of the end piece and at the opposite side a curved journal surface engaging the inner side of the said other member at the opening therein, the axes of the curved journal surfaces being transverse to one another, the side of the second rocker engaging the said other member having radially extended, opposed portions of U-shaped outline, a second resilient ring positioned on the stem at the outer side of the said other member, means engaging the stem to precompress the second resilient ring against the said outer side of the said other member with a force greater than that required to shift the segmental shoes with respect to the barrel, and U-shaped projections on the inner side of the said other member receiving the U-shaped portions of the second rocker to restrict rotary movement thereof relative to the members.

5. In a railway truck spring suspension, a plank member extending transversely of the suspension, a bolster member extending transversely of the suspension over the plank member, the plank and bolster having inner sides facing one another, spring means supporting the bolster member on the plank member, damping means associated with the plank and bolster comprising a barrel, segmental shoes movably mounted within and engaging the interior of the barrel, a rod extending into one end of the barrel through the segmental shoes, and means for yieldingly urging the segmental shoes outwardly against the barrel, including a coil spring positioned on the rod and associated with the segmental shoes, a retainer for the spring mounted on the rod, means for connecting the rod to one member, comprising an opening in the said one member receiving the rod, a first rigid rocker block positioned on the rod and having at one side a first curved journal surface in engagement with the retainer and at the opposite side a second curved journal surface in engagement with the inner side of the said one member, the axes of the curved journal surfaces being transverse to one another, the axis of the second curved journal surface being transverse to the direction in which the said one member extends, the said opposite side of the first rocker having outwardly extended, opposed portions of U-shaped outline, U-shaped projections on the said one side of the said one member engageable with and receiving the U-shaped portions of the rocker, to restrict rotary movement of the rocker about the rod as an axis, a first resilient ring positioned on the rod at the outer side of the said one member, means precompressing the first resilient ring against the said other side of the said one member with a force greater than that required to shift the segmental shoes with respect to the barrel, and means for connecting the barrel to the other member, comprising an opening in the other member, an end piece for the other end of the barrel having a base bonded to the said other end of the barrel, a stem projecting from the base into the opening in the said other member, a second rigid rocker block positioned on the stem and having at one side a first curved journal surface engaging the base of the end piece and at the opposite side a second curved journal surface engaging the inner side of the said one member at the hole, the axes of the curved journal surfaces being transverse to one another, the axis of the second curved journal surface being transverse to the direction in which the said other member extends, the side of the second rocker engaging the said one member having opposed outwardly extended portions of U-shaped outline, a second resilient ring positioned on the stem at the outer side of the said other member, means engaging the rod to precompress the second resilient ring against the said outer side of the said other member with a force greater than that required to shift the segmental shoes with respect to the barrel, and U-shaped projections on the said inner side of the said other member receiving the U-shaped portions of the second rocker to restricting rotary movement thereof about the stem as an axis.

6. In a railway truck spring suspension, a plank, a bolster paralleling the plank, inner sides of the plank and bolster facing one another, spring means supporting the bolster on the plank, damping means comprising relatively movable parts acting between the plank and bolster substantially in parallel with the springs, means comprising a connection of the damping means with the plank and a connection of the damping means with the bolster for causing the damping means to absorb energy upon all relative movement between the plank and bolster in the direction of support by the springs, the connection of the damping means with the plank comprising a hole in the plank, a first stem extending from the damping means through the hole, a first rigid rocker ring loosely mounted on the first stem having a curved journal surface at one side engaging the damping means and a second curved journal surface at the opposite side engaging the inner side of the plank, the axes of these curved journal surfaces being transverse to one another, the axis of the curved journal surface engaging the plank extending transversely to the length of the plank, means preventing rotation of the first rocker with respect to the plank about the first stem as an axis, a first resilient ring positioned on the first stem in engagement with the outer side of the plank, and means precompressing the first resilient ring by a force greater than that required for relative movement of the relatively movable parts of the damping means, and the connection of the damping means with the bolster comprising a hole in the bolster, a second stem extending from the damping means through the hole in the bolster, a second rigid rocker ring on the second stem having a curved journal surface at one side engaging the damping means and a curved journal surface at the opposite side engaging the inner side of the bolster, the axes of these curved journal surfaces being transverse to one another, the axis of the curved journal surface engaging the bolster extending transversely to the length of the bolster, means preventing rotation of the second rocker with respect to the bolster about the second stem as an axis, a second resilient ring positioned on the second stem in engagement with the outer side of the bolster, and means precompressing the second resilient ring by a force greater than that required for relative movement of the relatively movable parts of the damping means.

7. In combination, supporting and supported members, spring means acting between the members, damping means associated with the spring supported members comprising a barrel, segmental shoes movably mounted within and engaging the interior of the barrel, a rod having an end portion extending into one end of the barrel through the segmental shoes, and means for yieldingly urging the segmental shoes outwardly against the barrel, including a coil spring positioned on the rod with one end associated with the segmental shoes, a retainer for the spring positioned on the rod in engagement with the other end of the spring, means for connecting the barrel to one member, comprising an opening in the said one member, an end piece for the other end of the barrel having a recessed base bonded to the said other end of the barrel and a stem projecting from the base through the opening in the said one member and having a shoulder beyond the said one member, and a rigid rocker ring positioned on the stem and having at one side a curved journal surface engaging the recess in the base and at the opposite side a curved journal surface engaging the inner side of the said one member, the axes of the curved journal surfaces being transverse to one another, a resilient ring positioned on the stem at the other side of the said one member, means engaging the stem to precompress the resilient ring against the said other side of the said one member with a force greater than that required to shift the barrel with respect to the segmental shoes, the last mentioned means also engaging the shoulder on the stem to predetermine the precompression of the resilient ring, and means connecting the rod to the other member.

8. In combination, supporting and supported members, spring means acting between the members, damping means associated with the spring supported members comprising a barrel, segmental shoes movably mounted within and engaging the interior of the barrel, a rod extending into one end of the barrel through the segmental shoes, and means for yieldingly urging the segmental shoes outwardly against the barrel, including a precompressed coil spring positioned on the rod with one end associated with the segmental shoes, a retainer for the spring positioned on the rod in engagement with the other end of the coil spring, means for connecting the barrel to one member, comprising an opening in the said one member, a closure for the other end of the barrel having a base bonded to the said other end of the barrel, a stem projecting through the base and having an inner end engageable with the rod to limit relative movement in one direction of barrel and rod and an outer end projecting through the opening in the said one member, a rigid rocker ring positioned on the stem and having at one side a curved journal surface engaging the base and at the opposite side a curved journal surface engaging the inner side of the said one member at the opening, a resilient ring positioned on the stem at the outer side of the said one member, and means engaging the rod to precompress the resilient ring against the said other side of the said one member with a force greater than that required to shift the segmental shoes with respect to the barrel, and means connecting the rod to the other member.

9. In combination, supporting and supported members, resilient means acting between the members, damping means between the members comprising a barrel, segmental shoes frictionally engaging the interior of the barrel, a rod extending into an end of the barrel through the segmental shoes, cam means mounted on the rod and engageable with the shoes, a coil spring positioned on the rod with one end associated with the cam means and segmental shoes to urge the shoes outwardly against the barrel, a retaining ring positioned on the rod in engagement with the other end of the coil spring, means for connecting the barrel to one member, comprising an opening in the said one member, an end piece for the other end of the barrel having a base bonded to the said other end of the barrel, a stem projecting from the base into the opening in the said one member, a rigid rocker ring positioned on the stem and having a first curved journal portion at one side thereof engaging the base of the end piece and a second curved journal portion at the opposite side thereof engaging the said one member, the axes of the curved journal portions being transverse to one another, a resilient ring positioned on the stem at the other side of the said one member, means associated with the stem to precompress the resilient ring against the said one member with a force greater than that required to shift the segmental shoes with respect to the barrel, said last mentioned means comprising a rigid washer mounted on the stem and presenting a conical surface in face to face engagement with a face of the resilient ring to make the precompression of the resilient ring greater at the inner periphery of the resilient ring than at the outer periphery, and means connecting the rod to the other member.

10. In combination, a cylinder, segmental shoes movably mounted within and engageable with the interior of the cylinder, a rod having one end portion extending into the cylinder through an end thereof, a coil spring surrounding the rod, one end of the spring and a portion of the rod toward said one end having means associated with the segmental shoes so that relative movement between the rod and shoes will cause the shoes to be yieldingly urged outwardly against the cylinder, the rod having a shoulder toward its other end, a retainer for the spring associated with the shoulder and acting against the other end of the spring, a ring-like rocker block positioned on the rod and having a first curved journal portion in rolling engagement with the spring retainer and a second oppositely disposed curved journal portion adapted for rolling engagement with a member to which the said other end of the rod is to be connected, and means carried by the rod independent of the member for fixedly clamping the spring retainer to the shoulder, the last mentioned means for holding the spring retainer on the rod being independent of the connection of the rod to the member.

11. A snubber unit adapted to be connected between a pair of relatively movable members comprising a cylinder, a plurality of segmental shoes mounted within and having portions frictionally engaging the inside surface of the cylinder, said shoes each having two sets of inclined, diverging, wedging surfaces thereon, a rod having one end thereof extending into the cylinder through an end thereof and having a first shoulder generally near said one end thereof, a second shoulder generally near the other end of the rod and facing in the same direction as the first shoulder, a first wedge ring positioned on the rod in engagement with the first shoulder and wedgingly engaged with one set of inclined wedging surfaces on the segmental shoes, a second wedge ring positioned on the rod and in wedging engagement with the other set of inclined wedging surfaces on the segmental shoes, a coil spring positioned on the rod with one end in engagement with and exerting a force against the second wedge ring, and a retaining ring positioned on the rod in engagement with the other end of the coil spring and with the second shoulder, a sleeve connected to the said other end of the rod so as to hold the retaining ring against the second shoulder, means adapted to connect the said other end of the rod to one of the relatively movable members, comprising a first rigid rocker block surrounding and movably mounted on the sleeve and having at one side a first curved journal surface in engagement with the retaining ring and at the opposite side a second curved journal surface adapted to be mounted in engagement with an inner side of one of said movable members, these opposed curved journal surfaces of the rocker block having axes of generation transverse to one another, a resilient annulus positioned on the said other end of the rod and mounted in engagement with the outer side of the said one movable member, and means cooperating with the said other end of the rod to compress the resilient annulus against said outer side of the said one member with a force greater than that required to shift the segmental shoes along the inside surface of the cylinder, the last-mentioned means being in engagement with an end of the sleeve to predetermine the compression of the resilient annulus, and means adapted to connect the cylinder to the other movable member, said last-mentioned connecting means comprising a base member secured to the other end of the cylinder and having a stem projecting outwardly therefrom, a second rigid rocker block surrounding and movably mounted on the stem and having at one side a first curved journal surface in engagement with the base and at the opposite side a second curved journal surface adapted to be mounted in engagement with the inner side of the other movable member, the axes of generation of these opposed curved journal surfaces of the second rocker block being transverse to one another, a resilient annulus positioned on the stem adapted to be mounted in engagement with the outer side of the other movable member, and means cooperating with the stem to compress the last-mentioned annulus against the outer side of the said other movable member with a force greater than that required to shift the segmental shoes along the cylinder.

12. A shock absorber comprising a cylinder, a plurality of segmental shoes mounted within and frictionally engaging the inside surface of the cylinder, said shoes each having two sets of oppositely inclined wedging surfaces thereon, a rod having one end thereof extending into the cylinder through an end thereof and having a first shoulder generally near said one end thereof, a second shoulder generally near the other end of the rod and facing in the same direction as the first shoulder, a first wedge ring positioned on the rod in engagement with the first shoulder and having portions in wedging engagement with one set of inclined surfaces on the segmental shoes, a second wedge ring positioned on the rod having portions in wedging engagement with the other set of inclined surfaces on the segmental shoes, a coil spring positioned on the rod with one end in engagement with the second wedge ring, and a retaining ring positioned on the rod and mounted in engagement with the other end of the coil spring and with the second shoulder to effect compression of said spring, a sleeve connected to the said other end of the rod so as to hold the retaining ring against the second shoulder, a first rigid rocker block surrounding and movably mounted on the sleeve and having at one side a first convexly curved journal surface in engagement with the retaining ring and at the opposite side a second convexly curved journal surface adapted to be mounted in engagement with a shock absorber supporting member, a resilient annulus positioned on the rod and adapted to be said other end of the rod and adapted to be mounted in stressed engagement with a shock absorber supporting member, and means adapted to connect the other end of the cylinder to a shock absorber supporting member, said last-mentioned connecting means comprising a base member secured to the other end of the cylinder and having a stem projecting outwardly therefrom, a second rigid rocker block surrounding and movably mounted on the stem and having at one side a first convexly curved journal surface in engagement with the base and at the opposite side a second convexly curved journal surface adapted to be mounted in engagement with a shock absorber supporting member, and a resilient annulus positioned on the stem adapted to be mounted in stressed engagement with the last-mentioned shock absorber supporting member.

13. A shock absorber comprising a cylinder, a plurality of segmental shoes mounted within and frictionally engaging the inside surface of the cylinder, said shoes each having two sets of opposed, inclined, wedging surfaces thereon, a rod having one end thereof extending into the cylinder through an end thereof and having a first shoulder generally near said one end of the rod, a second shoulder generally near the other end of the rod, a first wedge ring mounted on the rod in engagement with the first shoulder and in wedging engagement with one set of inclined surfaces on the segmental shoes, a second wedge ring mounted on the rod in engagement with the other set of inclined surfaces on the segmental shoes, a compression type coil spring mounted on the rod with one end in engagement with the second wedge ring, and a retaining ring fixedly mounted on the rod in engagement with the other end of the coil spring and with the second shoulder to effect compression of said spring, a rigid rocker ring carried by the said other end of the rod having opposed transversely arranged journal surfaces adapted to connect said rod to a supporting member so as to permit universal pivotal movement of the shock absorber relative to the supporting member through rolling contact means, and means adapted to connect the other end of the cylinder to a supporting member, said last-mentioned connecting means comprising a base member secured to the other end of the cylinder and having an axially extending stem projecting therefrom, and a rigid rocker ring carried by the stem having opposed, transversely arranged, journal surfaces adapted to connect said stem to a supporting member so as to permit universal pivotal movement of said shock absorber relative to the supporting members through rolling contact means.

14. A shock absorber comprising a cylinder, shoes with wedge means thereon mounted within said cylinder arranged to be urged into frictional engagement with the inner surface of said cylinder, a base closing one end of the cylinder, an axially extending stem projecting from the outer side of said base adapted to be connected to a supporting member, a first rigid rocker block movably mounted about said stem, said rocker block having a first convexly curved rocker face in rolling contact with said base and a second, oppositely disposed, convexly curved rocker face adapted to be mounted in rolling engagement with the part of a supporting member to be associated with said stem, a first resilient means mounted on said stem adapted to provide means for preloading the connection of the first rocker block to the supporting member associated therewith, means on said stem to preload said first resilient means, a rod extending into said cylinder through the other end of said cylinder having a first end portion mounting wedge ring means engageable with the said shoe mounted wedge means within the cylinder, a retainer piece fixed to said rod at a point spaced from said first end portion, resilient means mounted on said rod so as to extend between said retainer piece and said wedge ring means to urge said wedge means against the inner surfaces of said cylinder, a second rigid rocker block movably mounted on said rod and arranged outwardly of said retainer piece, said second rocker block having a first convexly curved rocker face in rolling contact with said retaining piece and a second, oppositely disposed, convexly curved rocker face adapted to be mounted in rolling engagement with a part of a second supporting member to be associated therewith, and a second resilient means mounted on said rod outwardly of said second rocker block adapted to provide means for preloading the connection of said second rocker block to said second supporting member and means on said rod to preload said second resilient means.

15. An energy absorber comprising a cylinder, shoes with wedge means thereon mounted within said cylinder arranged to be urged into frictional engagement with the inner surface of said cylinder, a base closing one end of the cylinder, a stem projecting from the outer side of said base adapted to be connected to a supporting member, a first rigid rocker block surrounding and movably mounted about said stem, said rocker block having a first curved rocker face in rolling contact with said base and a second, oppositely disposed, curved rocker face adapted to be mounted in rolling engagement with the part of a supporting member to be associated with said stem, a rod extending into said cylinder through the other end of said cylinder having a first end portion mounting wedge means cooperatively associated with the said shoe mounted wedge means within the cylinder, a retainer piece fixed to said rod at a point spaced from said first end portion, precompressed resilient means mounted on said rod so as to extend between said retainer piece and said rod mounted wedge means to urge said shoe mounted wedge means against the inner surfaces of said cylinder, a second rigid rocker block movably mounted on said rod outwardly of said retainer piece, said second rocker block having a first curved rocker face in rolling contact with said retaining piece and a second, oppositely disposed, curved rocker face adapted to be mounted in rolling engagement with a part of a second supporting member to be associated therewith and means on said stem and said rod to maintain said rocker blocks in engagement with said supporting members.

16. A snubber unit comprising a cylinder, wedge means movably mounted within said cylinder adapted to be urged into frictional engagement with the inner surface of said cylinder, a base closing one end of the cylinder, a stem projecting from the outer side of said base adapted to be connected to a supporting member, a rigid first rocker block movably mounted about said stem, said rocker block having a first curved rocker face in rolling contact with said base and a second, oppositely disposed, curved rocker face adapted to be mounted in rolling engagement with the part of a supporting member associated with said stem, the axes of said oppositely disposed faces extending transversely to each other, a rod extending into said cylinder through the other end of said cylinder having a first end portion with means thereon to actuate the wedge means within the cylinder, a retainer piece fixed to said rod at a point spaced from said first end portion, resilient means mounted on said rod so as to extend between said retainer piece and said wedge means to urge said wedge means against the inner surfaces of said cylinder, and means mounted on said rod adapted to provide for pivotally connecting said rod to a second supporting member for universal pivotal movement.

17. A snubber unit comprising a barrel, friction shoes within said barrel having wedge means thereon, wedge rings within said barrel engageable with said wedge means to move said friction shoes into engagement with said barrel, a rod extending through one end of said barrel and threading through said friction shoes, said wedge means and said wedge rings and having an end thereof anchored to said wedge rings, a retainer member mounted on said rod at a point spaced from said wedge rings, resilient means mounted on said rod and extending between said wedge rings and said retainer member to urge said wedge rings into engagement with said wedge means, a first rigid rocker plate surrounding and movably mounted on said rod adjacent the outer side of said retainer member, said first rocker plate having the opposed faces thereof provided with journal portions each curved convexly to provide for a rolling contact between the plate faces and the surfaces engaged therewith, a base piece closing the other end of said barrel, a stem projecting from said base piece, a second rigid rocker plate movably mounted on said stem having the opposed faces thereof each provided with journal portions convexly curved to provide for a rolling contact between the plate faces and the surfaces engageable therewith, and means carried by said rod and said stem adapted to resiliently preload the connections between the rocker plates and the surfaces engaged therewith.

18. A shock absorber comprising a barrel, friction shoes within said barrel having wedge means thereon, wedge rings within said barrel engageable with said wedge means to move said friction shoes into engagement with said barrel, a rod extending through one end of said barrel and threading through said friction shoes, said wedge means and said wedge rings and having an end thereof anchored to said wedge rings, a retainer member mounted on said rod at a point spaced from said wedge rings, resilient means carried by said rod and extending between said wedge rings and said retainer member to urge said wedge rings into engagement with said wedge means and said wedge means into engagement with said barrel, means carried by said rod to permit pivotal connection of said rod to a supporting member, a base piece closing the other end of said barrel, a stem projecting from said base piece, a rigid rocker plate surrounding and movably mounted on said stem having the opposed faces thereof each provided with a convexly curved journal portion to provide for a rolling contact between the plate and the surfaces of the supporting member and base piece engageable therewith, and means carried by said stem to provide for resiliently preloading the connections between the rocker plate and the said surfaces engaged therewith.

19. A snubber unit comprising a cylinder having a closed end and an open end, friction means movably mounted with said cylinder and adapted to be engaged with said cylinder, a rod extending into said cylinder through the open end thereof having portions associated with said friction means to effect movement thereof, resilient means mounted on said rod so as to urge said friction means into engagement with said cylinder, a plate fixedly mounted on said rod outwardly of said resilient means, a rigid rocker plate movably mounted on said rod outwardly of and adjacent said retainer plate, said rocker plate having opposed faces each provided with convexly curved rocking surfaces one surface being arranged to engage said retainer plate and the other surface being arranged to engage a surface of shock absorber supporting member, an axially extending stem projecting outwardly from the closed end of said cylinder, a rigid rocker plate movably mounted on said stem, said last-mentioned rocker plate having opposed faces each provided with convexly curved rocking surfaces, one rocking surface of said second rocker plate being arranged to engage the closed end of said cylinder and the other rocking surface thereof being arranged to engage a shock absorber supporting member.

20. A rocker member to pivotally mount a movable member on a supporting member comprising a rigid, ring-like block having opposed faces with convexly curved, journal surfaces thereon adapted to be positioned between and in engagement with adjacent spaced portions of the movable and supporting members, and an opening through the rocker block extending through the opposed faces thereof adapted to receive a portion of the movable member.

21. A rocker member to pivotally mount a movable member on a supporting member comprising a rigid, ring-like block having opposed faces with convexly curved, journal surfaces thereon adapted to be positioned between and in rolling engagement with spaced adjacent portions of the movable and supporting members, and an opening through the rocker block extending through the opposed faces of the rocker member adapted to receive a portion of one of said members, the axes of the generation of the opposed, convexly curved, rocking surfaces of the block being arranged to extend transversely to each other.

22. A rocker member to pivotally mount a resiliently supported movable member on a supporting member comprising a plate-like rigid block having opposed faces with convexly curved, journal surfaces thereon adapted to be positioned between and in rolling engagement with spaced, adjacent portions of the movable and supporting members, an opening through the rocker block extending through the opposed faces of the rocker member adapted to receive a connecting portion of one of the said members, the axes of the opposed, convexly curved, rocking surfaces of the block being arranged to extend transversely to each other, and outwardly projecting anchor portions on said block adapted to be interengaged with mating portions on a supporting or supported member to restrict rotation of the block about the movable member as an axis.

23. In an energy absorber, end connections therefor each comprising a rod, a base piece fixed to said rod, a rigid, ring-like rocker block surrounding and movably mounted on said rod, said rocker block having opposed faces with rocking surfaces thereon each of which surfaces is convexly curved, one rocking surface engaging the base piece and the opposed rocking surface being arranged to engage a supporting member.

24. In an energy absorber, end connections therefor each comprising a rod, a base piece fixed to said rod, a rigid, ring-like rocker block surrounding and movably mounted on said rod, said rocker block having opposed faces with rocking surfaces thereon each of which surfaces is convexly curved, one rocking surface engaging the base piece and the opposed rocking surface being arranged to engage a supporting member, the axes of the opposed curved rocking surfaces extending transversely to one another.

25. In an energy absorber, end connections therefor each comprising a rod, a base piece fixed to said rod, a rigid, ring-like rocker block surrounding and movably mounted on said rod, said rocker block having opposed faces with rocking surfaces thereon each of which surfaces is convexly curved, one rocking surface engaging the base piece and the opposed rocking surface being arranged to engage a supporting member, the axes of the opposed curved rocking surfaces extending transversely to one another, and resilient means mounted on each rod and spaced from said rocker block adapted to provide means to preload the connections between the rocker block and the surfaces engaged therewith.

26. In a shock absorber comprising relatively movable end portions, each end portion including a base piece and a rod portion projecting from said base piece, a rigid ring-like, rocker plate movably mounted on each rod portion, each rocker plate including opposed faces with convexly curved rocking surfaces, one of which is rockingly engaged with the base piece and the other adapted to be rockingly engaged with a shock absorber supporting member, the rocker block connections between the shock absorber end portions and the supporting members providing for universal rocking movement of shock absorber relative to the supporting members due to a rolling action between the rocker blocks and the members engaged therewith.

27. A snubber unit adapted to be connected between a pair of relatively movable members comprising a cylinder, an axially extending stem portion fixed to one end of said cylinder and projecting outwardly therefrom, an axially extending rod portion extending into and projecting outwardly from the opposite end of said cylinder and axially movable relative to said stem portion, means within said cylinder associated with said rod and said cylinder adapted to damp relative axial movement between said stem and said rod portion, a first rigid rocker block surrounding and mounted on said stem portion, said first rocker block having a pair of opposed faces, one of said faces having a curved journal portion arranged for rolling contact with the end of said cylinder mounting said stem and the opposite face of said first rocker block having a curved journal portion adapted to be mounted in rolling contact with one of said movable members, means on said stem engageable with said one of said movable members to maintain the journal portions of said first rocker block in engagement with said cylinder and said one of said members, a second rigid rocker block surrounding and mounted on said rod member outwardly of said cylinder and engageable with an abutment means carried by said rod, said second rigid rocker block having a pair of opposed faces, one of said faces including a curved journal portion in rolling contact with said abutment means on said rod, the opposite face of said second rocker block having a curved journal portion adapted to be mounted in rolling contact with the other of said movable members, and means on said rod engageable with said other movable member to maintain the opposed journal portions of said second rocker block in face to face engagement with said abutment means and said other movable member.

28. In a snubber unit as set forth in claim 27 wherein the journal portions on the opposed faces of each of the rigid rocker blocks are arranged to extend transversely to one another.

29. A snubber unit adapted to be connected between a pair of relatively movable members comprising a cylinder, a first axially extending connecting portion fixed to one end of said cylinder and projecting outwardly therefrom, a second axially extending connecting portion extending into and projecting outwardly from the opposite end of said cylinder and axially movable relative to said first connecting portion, means within said cylinder associated with said second connecting portion and said cylinder adapted to damp relative axial movement between said first and second connecting portions, a first rigid rocker block surrounding and mounted on said first connecting portion, said first rocker block having a pair of opposed faces, one of said faces having a curved journal portion arranged for rolling contact with the end of said cylinder mounting said first connecting portion and the opposite face of said first rocker block having a curved journal portion adapted to be mounted in rolling contact with one of said movable members, means engageable with said first connecting portion and said one of said movable members to maintain the journal portions of said first rocker block in engagement with said cylinder and said one of said movable members, a second rigid rocker block surrounding and mounted on said second connecting portion outwardly of said cylinder and engageable with abutment means carried by said second connecting portion, said second rigid rocker block having a pair of opposed faces, one of said faces including a curved journal portion in rolling contact with said abutment means on said second connecting portion, the opposite face of said second rocker block having a curved journal portion adapted to be mounted in rolling contact with the other of said movable members, and means on said second connecting portion engageable with said other movable member to maintain the opposed journal portions of said second rocker block in face to face engagement with said abutment means and said other movable member.

30. In a snubber unit as set forth in claim 29 wherein the journal portions on the opposed faces of each of the rigid rocker blocks are arranged to extend transversely to one another.

ROBERT N. JANEWAY.
WILLIAM VAN DER SLUYS.

(References on following page)

References Cited

The following references are of record in the file of this patent:

UNITED STATES PATENTS

| Number | Name | Date |
|---|---|---|
| 949,094 | Sonander | Feb. 15, 1910 |
| 1,073,161 | O'Connor | Sept. 16, 1913 |
| 1,689,903 | Wise | Oct. 30, 1928 |
| 2,059,503 | Webb | Nov. 3, 1936 |
| 2,334,597 | Badertscher | Nov. 16, 1943 |
| 2,344,034 | Elsey | Mar. 14, 1944 |
| 2,404,666 | Snyder | July 23, 1946 |

FOREIGN PATENTS

| Number | Country | Date |
|---|---|---|
| 656,761 | France | Jan. 5, 1929 |
| 747,245 | France | Mar. 28, 1933 |

Certificate of Correction

Patent No. 2,574,788 November 13, 1951

ROBERT N. JANEWAY ET AL.

It is hereby certified that error appears in the printed specification of the above numbered patent requiring correction as follows:

Column 8, line 16, after "therein" insert a comma; column 17, line 1, for "a rigid first" read *a first rigid*; column 18, line 61, after "plate-like" insert a comma;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*